United States Patent
Pessolano

(10) Patent No.: US 7,246,251 B2
(45) Date of Patent: Jul. 17, 2007

(54) ADAPTIVE DATA PROCESSING SCHEME BASED ON DELAY FORECAST

(75) Inventor: Francesco Pessolano, Eindhoven (NL)

(73) Assignee: NXP B.V., Eindhoven (NL)

( * ) Notice: Subject to any disclaimer, the term of this patent is extended or adjusted under 35 U.S.C. 154(b) by 63 days.

(21) Appl. No.: 10/527,853

(22) PCT Filed: Aug. 8, 2003

(86) PCT No.: PCT/IB03/03568

§ 371 (c)(1),
(2), (4) Date: Mar. 16, 2005

(87) PCT Pub. No.: WO2004/027528

PCT Pub. Date: Apr. 1, 2004

(65) Prior Publication Data

US 2005/0273639 A1    Dec. 8, 2005

(30) Foreign Application Priority Data

Sep. 20, 2002  (EP)  ................................ 02078907

(51) Int. Cl.
*G06F 1/12* (2006.01)

(52) U.S. Cl. ........................ 713/401; 713/502; 710/58

(58) Field of Classification Search ..................... None
See application file for complete search history.

(56) References Cited

U.S. PATENT DOCUMENTS

| | | | |
|---|---|---|---|
| 6,522,706 B1 * | 2/2003 | Bahai et al. | 375/343 |
| 6,807,500 B2 * | 10/2004 | Johnson et al. | 702/107 |
| 7,036,037 B1 * | 4/2006 | Paul et al. | 713/401 |

FOREIGN PATENT DOCUMENTS

| | | |
|---|---|---|
| WO | WO 9950722 | 10/1999 |
| WO | WO 0178423 A1 | 10/2001 |

\* cited by examiner

*Primary Examiner*—Thuan Du

(57) ABSTRACT

The present invention relates to a data processing circuitry and method of processing an input data pattern and outputting an output data pattern after a processing delay which depends on a processing activity of the data processing circuitry, wherein the processing delay is estimated based on the input pattern and the processing is controlled in response to the estimated processing delay. The processing control may be a power control based on an activity monitoring or a clock control in a pipeline structure. Thereby, an efficient solution is provided to derive the current activity of the processing circuitry in order to dynamically adapt its operating conditions to its demands.

14 Claims, 3 Drawing Sheets

ADAPTIVE DATA PROCESSING SCHEME BASED ON DELAY FORECAST

The present invention relates to a method and data processing circuitry for processing an input data pattern and for outputting an output data pattern after a processing delay which depends on a processing activity of said data processing circuitry.

Integrated systems are being introduced into a range of applications to undertake comprehensive control functions. In general, strong dynamic coupling between processes requires specific control. Even if the individual processes are stable, the coupled processes might not be. Thus, the relationship between system architecture and control performance must be determined to ensure reliable operation with minimum performance degradation and optimum power supply.

In order to reduce power waste in current integrated systems, a very efficient solution is to somehow guess or deduce the current activity of such a system in order to dynamically adapt its operation conditions, such as power supply and frequency, to its demands. In such a way the system can be supplied with the required power only, i.e. more power on high activity levels and less power on low activity levels.

Furthermore, in pipeline systems, the frequency of clock signals must be selected such that each stage of the pipeline processing structure has enough time to complete its operation correctly in every working condition and with every input pattern. However, it is well known that a generic pipeline stage produces its output with a delay which depends on the current input patterns. Therefore, the standard pipelines strategy adopted in synchronous systems fails in exploiting this behavior.

It is therefore an object of the present invention to provide an improved data processing circuitry and processing control method, by means of which various operating conditions of integrated systems can be dynamically adapted to the current system activity.

This object is achieved by a data processing circuitry as claimed in claim 1 and a processing control method as claimed in claim 12.

Accordingly, the processing delay is estimated on the basis of the input data pattern to obtain information about the system activity. Every time a new input pattern is received, the output pattern will be generated after a certain delay. This delay depends on the processing activity introduced or induced by the new input pattern. It can thus be concluded that the input pattern causing the greatest delay is most likely to produce the maximum activity inside the module. The estimated activity can then be used to optimize operation conditions or parameters such as power supply, clock frequency or the like of the integrated system.

Consequently, a simple technique is provided which can be adopted even in current system designs and which is scalable for systems of different size, to thereby increase system performance with respect to various system parameters.

Moreover, due to the fact that the proposed estimation can be implemented on top of any standard design, compatibility with standard tooling and standard design techniques can be achieved.

The estimation means may comprise a look-up table for storing the estimated processing delay. Alternatively, the estimation means may comprise a programmable delay line which is programmed by the input data pattern. In the first case, the look-up table may be addressed by the input data pattern to output the estimated processing delay. In the latter case, the programmable delay line may be adapted to generate an output signal after expiry of the estimated processing delay.

The estimation means may be adapted to estimate the processing delay based on a sequence of input data patterns. Thereby, a forecast of the activity and its development is possible.

The control means may be arranged to derive the processing activity from the estimated delay, and to control the power supply of the data processing circuitry in response to the derived processing activity. The power supply can thus be dynamically adapted to the operating conditions of the system.

As an example for another operating parameter or condition, the control means may be adapted to control the clock supply to the data processing circuitry in response to the estimated processing delay. Thereby, the clock supply for each stage of a pipeline structure can be selectively gated based on the processing delay of each stage. Thereby, each pipeline stage has enough time to complete its operation correctly in every working condition and with every input pattern. In particular, the control means may be arranged to un-gate the clock supply if the previous stage has produced a valid output signal and the following stage has stored the output signal. The estimated processing delay may be expressed as a number of cycles of the clock signal.

In the following, the present invention will be described in greater detail on the basis of preferred embodiments with reference to the accompanying drawings, in which.

Figure 1:
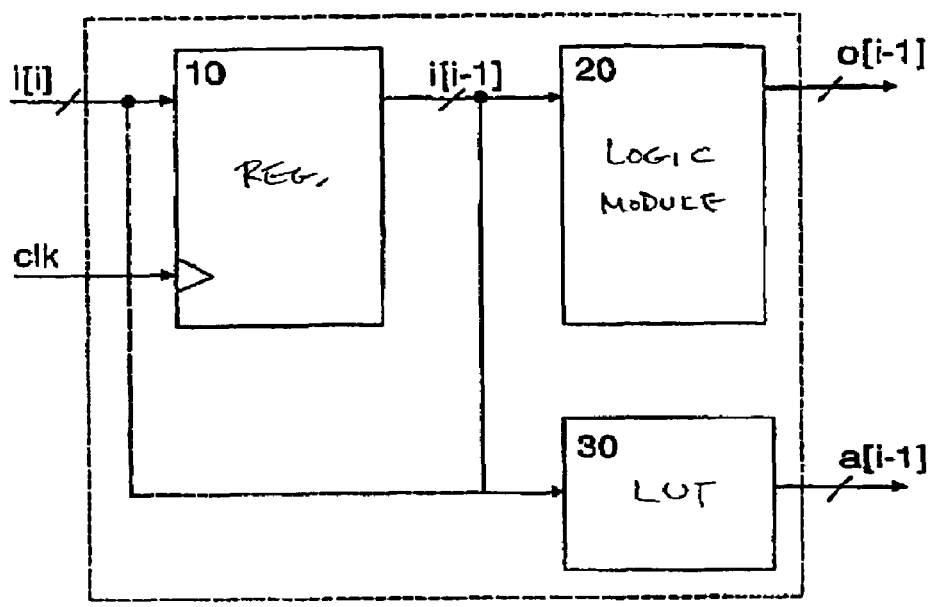
FIG. 1 shows a schematic block diagram of a data processing scheme according to a first preferred embodiment.

A first preferred embodiment will now be described on the basis of a processing scheme as shown in FIG. 1.

According to FIG. 1, an input data pattern "i[i−1]" is supplied to a generic logic module 20. Every time the generic logic module 20 receives an input data pattern "i[i−1]" a new output pattern "o[i−1]" will be generated after a certain delay. The generic logic module 20 may be any kind of data processing device or circuitry arranged to generate an output data pattern based on a supplied input data pattern.

According to the first preferred embodiment, a processing delay in the generic logic module 20 is estimated based on the input data pattern "i[i−1]" using a programmable memory device, such as a look-up table 30, in which estimated processing delays for the generic logic module 20 have been stored. The look-up table 30 with the estimated delays can be easily generated at design time of the logic circuitry based on simulations of the generic logic module 20 under control. Thus, the input data pattern "i[i−1]" is also supplied to the look-up table 30 so as to address the look-up table 30 which outputs a corresponding delay value "a[i−1]" or a corresponding activity value which is based on the delay value "a[i−1]". Furthermore, the processing scheme comprises a latch or register 10 which stores a new input data pattern "i[i]" in response to a clock signal "clk" supplied to a clock input of the register 10. Thus, the new input data pattern "i[i]" can be stored during the processing delay of the previous input data pattern "i[i−1]".

As a modification or alternative to the above processing circuitry 100, the next or new input data pattern "i[i]" can be used to address the look-up table 30 in order to generate the delay value "a[i−1]". In this case, the delay value "a[i−1]" corresponds to the delay forecast for the processing of the next input pattern "i[i]" at the generic logic module 20.

As another modification, the look-up table 30 may be replaced by a programmable delay line, which is programmed based on the current or next input data pattern so as to output a signal after a predetermined delay corresponding to the estimated delay value of the processing delay of the generic logic module 20.

Accordingly, the processing circuitry 100 is adapted to provide the delay value "a[i−1]" as an additional output for performing activity monitoring based on the delay forecast.

Figure 2:
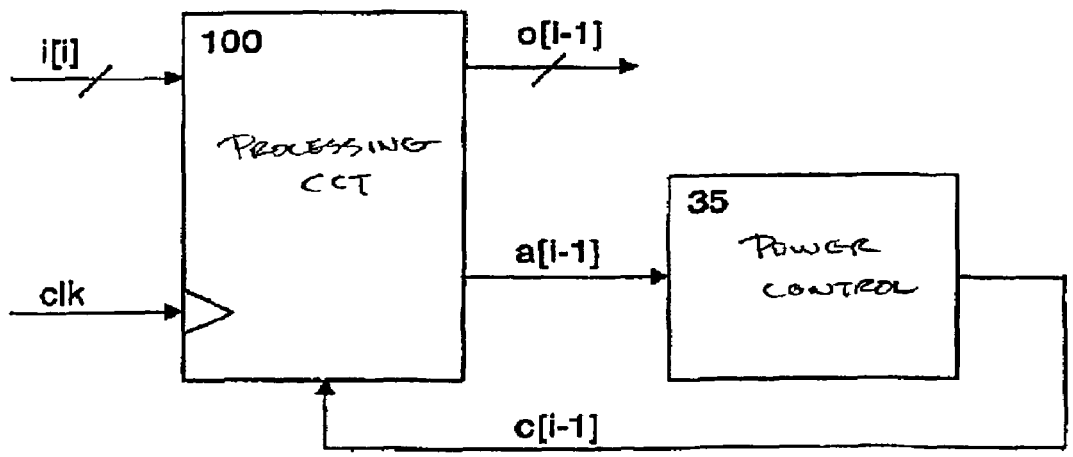
FIG. 2 shows an example of a feed-back control loop using the proposed processing scheme according to the first preferred embodiment.

FIG. 2 shows an example of a feedback control loop using the above processing circuitry 100. According to FIG. 2, a power control unit 35 is provided in the feedback loop which evaluates the delay value "a[i−1]" in order to generate a control output "c[i−1]" supplied to the processing circuitry 100 in order to control power supply to the individual processing units, in particular to the generic logic module 20. Thereby, the power supply or any other suitable operating condition of the processing circuitry 100 can be controlled on the basis of the activity of the generic logic module 20, determined based on the delay forecast.

The granularity or resolution of the monitoring process can be changed by changing the resolution of the values stored in the look-up table 30. Furthermore, it is noted that the delay value may be generated based on a sequence of input patterns "i[i]" . . . "i[i+n]", wherein the register 10 or the delay table 30 may be arranged to store a plurality of successive input patterns "i[i]" . . . "i[i+n]", so as to evaluate this sequence. Such an evaluation may be based on a logic processing or comparison of the successive input data patterns "i[i]" . . . "i[i+n]".

In the following, a second preferred embodiment will be described as an example of a dynamic adjustment of a clock signal of a pipeline structure. Standard pipelining methods adopt a global clock that controls all the processing elements, e.g. flip-flops, in every stage of the pipeline.

Figure 3:
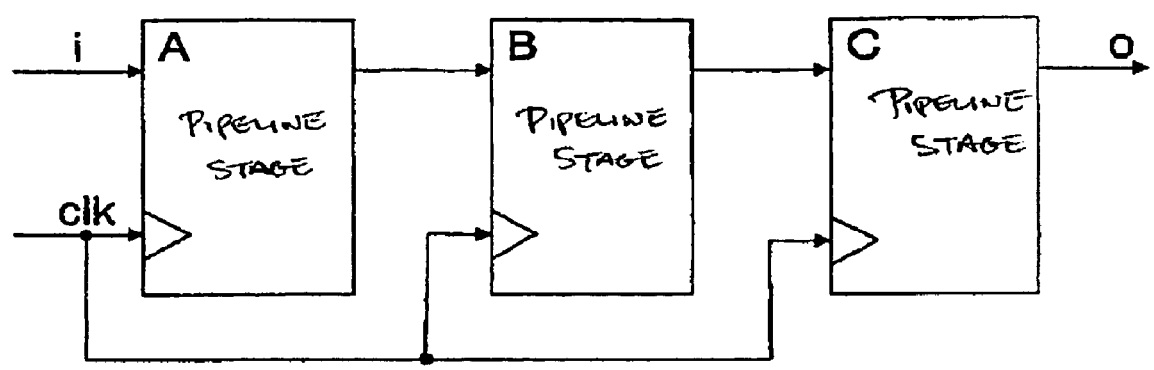
FIG. 3 shows a schematic block diagram of a standard pipelining scheme.

FIG. 3 shows a schematic diagram of a standard pipelining scheme comprising a plurality of pipeline stages A, B and C to which an input signal "i" is supplied and at the output of which an output signal "o" is generated after a predetermined number of clock cycles corresponding to the number of stages. Due to the concurrent parallel supply of the clock signal "clk" to the pipeline stages A, B and C, each stage is clocked at the same timing. Therefore, the frequency of the clock signal "clk" must be selected such that each pipeline stage has enough time to complete its individual operation.

Figure 4:
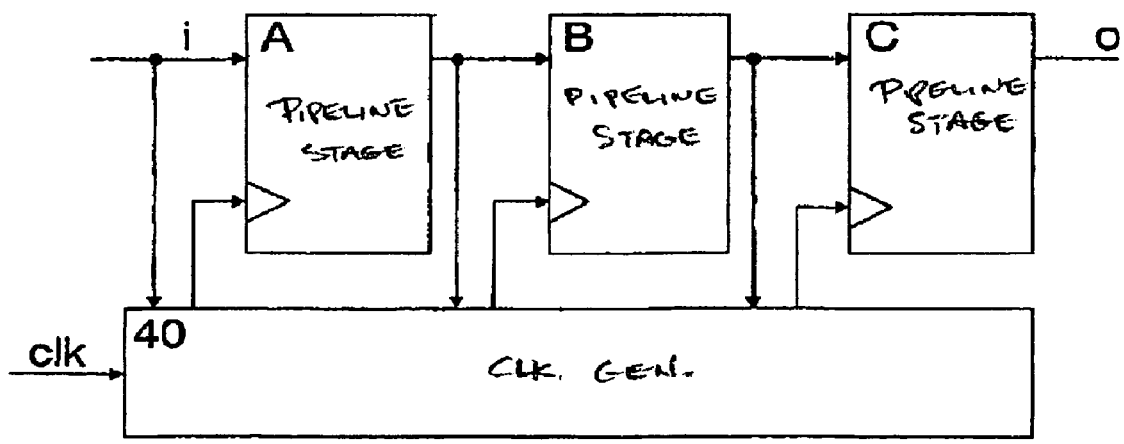
FIG. 4 shows a schematic block diagram of a pipelining scheme according to a second preferred embodiment.

FIG. 4 shows a schematic block diagram of a pipeline structure according to the second preferred embodiment. In the proposed pipeline structure, the data-dependent behavior in the synchronous pipeline circuitry is exploited on the basis of a delay forecast for each individual pipeline stage. The global clock signal "clk" is selectively gated for each stage in the pipeline depending on its current input pattern. Thus, if a pipeline stage has not completed its operation correctly, a pipeline clock generator 40 is adapted to suppress or gate the respective supply of the global clock signal "clk" until a valid output has been produced at the respective stage and the following stage has stored the new result.

Figure 5:
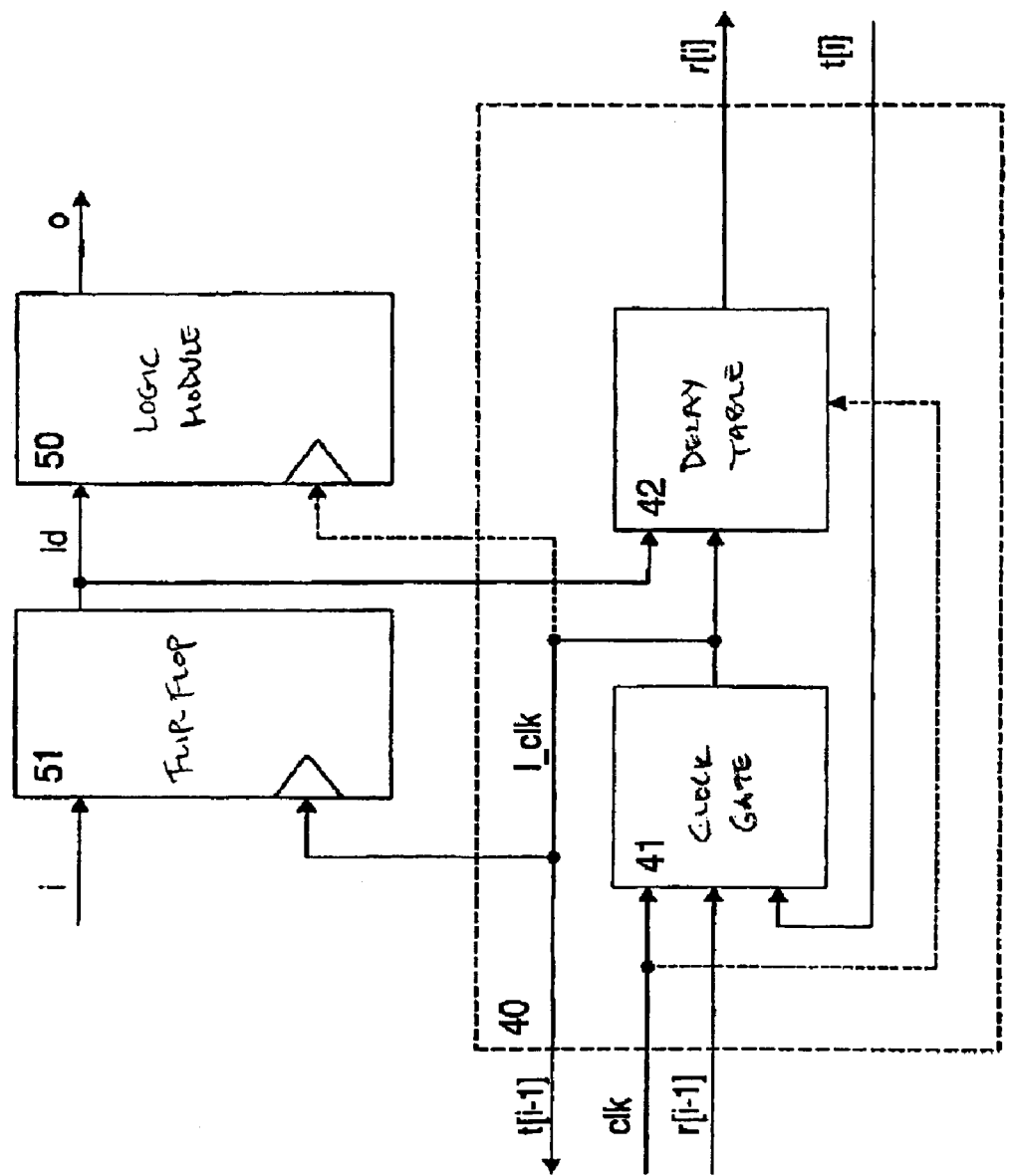
FIG. 5 shows a more detailed diagram of a typical stage of the proposed pipelining scheme according to the second preferred embodiment.

FIG. 5 shows a more detailed block diagram of an individual stage of the proposed pipeline structure shown in FIG. 4. According to FIG. 5, the pipeline clock generator 40 comprises a clock gate 41 and a delay table 42 in which estimated delay values for specific input patterns of the corresponding pipeline stage are stored. These delay values may have been obtained on the basis of simulations or measurements performed at design stage of the circuitry. Furthermore, the pipeline stage comprises a flip-flop circuit which is set according to the input data pattern "i" in response to a local clock signal "l_clk" generated by the clock gate 41 based on the global clock "clk" supplied thereto. At the output of the flip-flop circuit 51, the set input data pattern id are supplied to a logic module 50 which is adapted to generate a desired output pattern o after a respective processing delay. The input data pattern id is also supplied to the look-up table 42 together with the local clock "l_clk". Based on these input signals the look-up table 42 generates a ready signal "r[i]" after a delay which corresponds to the stored estimated delay of the logic unit 50 for the current input data id.

The generated local clock "l_clk" is also output as a taken signal "t[i−1]" to the previous stage, and the ready signal "r[i−1]" of the previous stage is supplied to the clock gate. Furthermore, the taken signal "t[i]" of the succeeding or following stage is supplied to the clock gate 41 of the present stage. If the logic module 50 operates on a clock basis, the local clock signal "l_clk" may be supplied to the logic unit 50 as well, as indicated by the broken arrow in FIG. 5.

The global clock "clk" is selectively gated for each stage in the pipeline depending on its current input data pattern id. The delay table 42 receives as its inputs the gated local clock "l_ck" and the current input pattern id and produces a ready signal "r[i]". This signal is asserted after a certain delay, which may be expressed as a number of cycles of the global clock "clk", to signal that the stage has produced a valid output. The estimated delay stored in the delay or look-up table 42 depends on the current input pattern and may have been obtain during the circuit design based on simulations or measurements. Moreover, a programming functionality may be provided at a look-up table 42 so as to update the estimated delays to provide a flexible design. The ready signal "r[i]" is released when the gated local clock "l_ck" goes low. The clock gate circuit 41 un-gates or releases the global clock "clk" when the previous stage has produced a valid output, i.e. when the ready signal "r[i−1]" of the previous stage goes high, and the following stage has stored the new result, i.e. the taken signal "t[i]" which indicates the local clock of the following stage is activated e.g. shows a pulse.

Accordingly, the gating or suppressing of the global clock "clk" is based on the ready signal and the taken signal, which indicate whether the pipeline stage has enough time to complete its operation correctly. Thereby, each stage mimics the behavior of an asynchronous pipeline stage, but uses the global clock "clk" as a reference clock. In this way, it is possible to retain the data-dependent behavior of asynchronous systems as well as all the advantages of a synchronous system, such as testability, easy design, predictability, etc.

Optionally, the look-up table 42 may use the global clock "clk" to generate the ready signal, as indicated by the broken arrow in FIG. 5. Furthermore, the clock gate circuit 41 may use different strategies or timings in generating and detecting the taken signal. The proposed pipeline clock generator structure may be extended to provide a disabling function in a test and debug mode of the pipeline scheme.

Furthermore, in special circumstances, e.g. where input and output of a stage are connected to the same unit, the taken signal may not be required.

The clock gate circuit may be a simple logic circuit having the desired gating functionality based on the ready signal "r[i−1]" of the previous stage and the taken signal "t[i]" of the following stage.

It is noted that the present invention is not restricted to the above preferred embodiments but can be applied in any data processing circuitry in which a processing delay depends on the input pattern. The preferred embodiments may thus vary within the scope of the attached claims.

The invention claimed is:

1. A data processing circuit for processing an input data pattern and for outputting an output data pattern, said data processing circuitry comprising:
   a) estimation means for estimating a processing delay in response to said input data pattern, wherein the estimated processing delay corresponds to a delay that is caused as a function of a processing activity induced in said data processing circuit by said input data pattern; and
   b) control means for controlling said processing of the input data pattern by said data processing circuit according to the processing activity of said data processing circuit in response to said estimated processing delay.

2. A circuitry according to claim 1, wherein said estimation means comprises a look-up table for storing said estimated processing delay.

3. A circuitry according to claim 2, wherein said look-up table is addressed by said input data pattern to output said estimated processing delay.

4. A circuitry according to claim 1, wherein said estimation means comprises a programmable delay line which is programmed by said input data pattern.

5. A circuitry according to claim 4, wherein said programmable delay line is adapted to generate an output signal after expiry of said estimated processing delay.

6. A circuitry according to claim 1, wherein said estimation means is adapted to estimate said processing delay based on a sequence of input data patterns.

7. A circuitry according to claim 1, wherein said control means is arranged to derive said processing activity from said estimated delay, and to control power supply of said data processing circuitry in response to said derived processing activity.

8. A circuitry according to claim 1, wherein said control means is adapted to control the clock supply to said data processing circuitry in response to said estimated processing delay.

9. A circuitry according to claim 8, wherein said data processing circuitry has a pipeline structure and said control means is adapted to selectively gate said clock supply for each stage of said pipeline structure.

10. A circuitry according to claim 9, wherein said control means is arranged to un-gate said clock supply if the previous stage has produced a valid output signal and the following stage has stored said output signal.

11. A circuitry according to claim 1, wherein said estimated processing delay is expressed as a number of cycles of said clock signal.

12. A method of controlling processing of an input data pattern and for outputting an output data pattern in a data processing circuit, said method comprising:
   a) estimating a processing delay in response to said input data pattern, wherein the estimated processing delay corresponds to a delay that is caused as a function of a processing activity induced in the data processing circuit by said input data pattern; and
   b) controlling a performing of said processing of the input data pattern by the data processing circuit according to the processing activity of the data processing circuit in response to said estimated processing delay.

13. A method according to claim 12, wherein said controlling further includes a power control based on an activity monitoring of the processing activity of the data processing circuit.

14. A method according to claim 12, wherein said controlling further includes a control of a clock supply to a synchronous pipeline structure of the data processing circuit.

* * * * *